US011811021B2

(12) United States Patent
Yu et al.

(10) Patent No.: US 11,811,021 B2
(45) Date of Patent: Nov. 7, 2023

(54) PRECURSOR STRUCTURE, LAMINATION FILM OF THE SAME, AND MANUFACTURING METHOD OF ION-CONDUCTING LAYER USING THE SAME

(71) Applicant: INDUSTRIAL TECHNOLOGY RESEARCH INSTITUTE, Hsinchu (TW)

(72) Inventors: Sheng-Min Yu, Taoyuan (TW); Tzu-Yu Liu, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 499 days.

(21) Appl. No.: 16/915,578

(22) Filed: Jun. 29, 2020

(65) Prior Publication Data
US 2021/0203003 A1    Jul. 1, 2021

(30) Foreign Application Priority Data
Dec. 31, 2019    (TW) .................. 108148652

(51) Int. Cl.
*H01M 10/0585*    (2010.01)
*B32B 15/04*    (2006.01)
(Continued)

(52) U.S. Cl.
CPC .......... *H01M 10/0585* (2013.01); *B32B 9/04* (2013.01); *B32B 15/04* (2013.01); *C04B 35/50* (2013.01);
(Continued)

(58) Field of Classification Search
CPC ............ C04B 35/50; C04B 2235/3227; C04B 2235/762
See application file for complete search history.

(56) References Cited

U.S. PATENT DOCUMENTS 8,574,772 B2   11/2013  Suyama et al.
10,361,452 B2   7/2019  Nishizaki et al.
(Continued)

FOREIGN PATENT DOCUMENTS

CN    105186031 A    12/2015
CN    107851774 A     3/2018
(Continued)

OTHER PUBLICATIONS

Speakman, Scott A., et al. "Development of proton conductors using pyrochlore-perovskite phase boundaries." Journal of materials engineering and performance 13 (2004): 303-308. (Year: 2004).*
(Continued)

*Primary Examiner* — Karl E Group
*Assistant Examiner* — Cameron K Miller
(74) *Attorney, Agent, or Firm* — Birch, Stewart, Kolasch & Birch, LLP (57) ABSTRACT

A precursor structure is provided. The precursor structure has the following chemical formula:

$$(La_2Zr_{2-x}M_xO_7) \cdot \frac{1}{2}(La_{2-y}M'_yO_3),$$

wherein M is a trivalent ion or a pentavalent ion, M' is a bivalent ion, x=0-1, y=0-1.5, and the precursor structure includes a pyrochlore phase. Since the pyrochlore phase may be transformed into the garnet phase through a lithiation process and the phase transition temperature is lower (e.g., 500-1000° C.), the precursor structure may be co-fired with the cathode material (e.g., lithium cobalt oxide (LiCoO$_2$)) to form a thin lamination structure. That is, the
(Continued)

thickness of the solid electrolyte may be effectively reduced, thereby improving the ionic conductivity of the solid electrolyte ion battery.

17 Claims, 10 Drawing Sheets

(51) Int. Cl.
    B32B 9/04       (2006.01)
    H01M 10/0562   (2010.01)
    H01M 10/0525   (2010.01)
    H01M 4/485     (2010.01)
    C04B 35/50     (2006.01)

(52) U.S. Cl.
    CPC ....... H01M 4/485 (2013.01); H01M 10/0525 (2013.01); H01M 10/0562 (2013.01); *B32B 2311/22* (2013.01); *B32B 2457/10* (2013.01); *C04B 2235/3227* (2013.01); *C04B 2235/762* (2013.01); *H01M 2300/0077* (2013.01)

(56) References Cited

U.S. PATENT DOCUMENTS

| 10,403,932 | B2 | 9/2019 | Choi et al. | |
|---|---|---|---|---|
| 2015/0056519 | A1* | 2/2015 | Ohta | H01M 4/5825 264/618 |
| 2017/0022112 | A1 | 1/2017 | Karpenko et al. | |
| 2017/0155169 | A1 | 6/2017 | Hitz et al. | |
| 2017/0338522 | A1 | 11/2017 | Hu et al. | |

FOREIGN PATENT DOCUMENTS

| CN | 109256852 | A | 1/2019 |
|---|---|---|---|
| CN | 109830740 | A | 5/2019 |
| CN | 110071327 | A | 7/2019 |
| CN | 110176627 | A | 8/2019 |
| CN | 110581303 | A | 12/2019 |
| TW | 201933668 | A | 8/2019 |

OTHER PUBLICATIONS

Trapaga-Martinez, Luis G., and Carlos G. Levi. Multiphase-Multifunctional Ceramic Coatings. Centro De Investigacion En Materiales Avanzados SC Chih (Mexico), 2013. (Year: 2013).*

Mikuśkiewicz, Marta, G. Moskal, and A. Jasik. "Degradation of La2Zr2O7thermal barrier coatings." Ochrona przed Korozją (2018). (Year: 2018).*

Deviannapoorani et al., "Synthesis of lithium garnets from La2Zr2O7 pyrochlore", Solid State Ionics, vol. 283, 2015, pp. 123-130.

Fu et al., "Three-dimensional bilayer garnet solid electrolyte based high energy density lithium metal-sulfur batteries", Energy & Environmental Science, 2017, vol. 10, pp. 1568-1575.

Fu et al., "Toward garnet electrolyte-based Li metal batteries: An ultrathin, highly effective, artificial solid-state electrolyte/metallic Li interface", Science Advances, vol. 3, No. 4, 2017, e1601659, total 12 pages.

Rawlence et al., "On the chemical stability of post-lithiated garnet Al-stabilized Li7La3Zr2O12 solid state electrolyte thin films", Nanoscale, Issue 31, 2016, 14746-14753, total 21 pages.

Yang et al.,"Densification and lithium ion conductivity of garnet-type Li7—xLa3Zr2—xTaxO12 (x=0.25) solid electrolytes", Chin. Phys. B, vol. 22, No. 7, (2013), pp. 078201-1 to 078201-5, total 6 pages.

* cited by examiner

PRECURSOR STRUCTURE, LAMINATION FILM OF THE SAME, AND MANUFACTURING METHOD OF ION-CONDUCTING LAYER USING THE SAME

CROSS REFERENCE TO RELATED APPLICATIONS

This application claims the benefit of Taiwan Patent Application No. 108148652, filed Dec. 31, 2019, the entirety of which is incorporated by reference herein.

TECHNICAL FIELD

Embodiments of the present disclosure relate to a precursor structure, a lamination film of the same, and a manufacturing method of an ion-conducting layer using the same.

BACKGROUND

Liquid electrolytes are often used in general ion batteries (e.g., lithium batteries). Since the liquid electrolytes are organic, corrosive and flammable, when the liquid electrolytes leak from the ion batteries, safety issues such as explosion may occur. Solid electrolytes are more stable than liquid electrolytes and do not have safety issues such as flammability. Therefore, the technology of replacing liquid electrolytes with solid electrolytes has been widely used.

However, in common solid electrolyte ion batteries, due to the low structural strength of the solid electrolyte layer and the formation temperature of the solid electrolyte layer (e.g., 1100-1200° C.) is higher than that of the positive electrode material, there may be problems such as being unable to be thin, or poor ionic conductivity.

SUMMARY

According to some embodiments of the present disclosure, a precursor structure including a pyrochlore phase, a lamination film of the same, and a manufacturing method of an ion-conducting layer using the same are provided to effectively reduce the thickness of the solid electrolyte formed by the precursor structure and the lamination film, thereby improving the ionic conductivity of the solid electrolyte ion battery.

The embodiments of the present disclosure include a precursor structure. The precursor structure has the following chemical formula:

$$(La_2Zr_{2-x}M_xO_7) \cdot \frac{1}{2}(La_{2-y}M'_yO_3),$$

wherein M is a trivalent ion or a pentavalent ion, M' is a bivalent ion, x=0-1, y=0-1.5, and the precursor structure includes a pyrochlore phase.

The embodiments of the present disclosure include a lamination film. The lamination film includes a precursor structure and an active structure disposed on one side of the precursor structure. The precursor structure has the following chemical formula:

$$(La_2Zr_{2-x}M_xO_7) \cdot \frac{1}{2}(La_{2-y}M'_yO_3),$$

wherein M is a trivalent ion or a pentavalent ion, M' is a bivalent ion, x=0-1, y=0-1.5, and the precursor structure includes a pyrochlore phase.

The embodiments of the present disclosure include a manufacturing method of an ion-conducting layer. The manufacturing method of the ion-conducting layer includes laminating the foregoing precursor structure and an active structure to form a lamination film. The manufacturing method of the ion-conducting layer further includes heating the lamination film in a lithium-containing environment, so that the pyrochlore phase is transformed into a garnet phase.

The embodiments of the present disclosure include a forming method of a solid-state ion battery series connection structure. The forming method of the solid-state ion battery series connection structure includes providing a substrate. The forming method of the solid-state ion battery series connection structure also includes forming a plurality of lamination films on the substrate. The lamination films are formed of a plurality of forgoing precursor structures and a plurality of active structures. The forming method of the solid-state ion battery series connection structure further includes covering the lamination films with a lithium-containing diffusion sheet. The forming method of the solid-state ion battery series connection structure includes heating the lamination films to transform the pyrochlore phases of the precursor structures into garnet phases to form a plurality of active structure lamination films. The forming method of the solid-state ion battery series connection structure also includes removing the lithium-containing diffusion sheet. The forming method of the solid-state ion battery series connection structure further includes forming a plurality of first metal layers on the substrate. Each of the first metal layers is adjacent to each of the active structure lamination films and disposed on one side opposite to each of the active structures. The forming method of the solid-state ion battery series connection structure includes forming a plurality of second metal layers on the substrate. The second metal layers fill the remaining spaces on the substrate.

Since the pyrochlore phase of the precursor structure according to the embodiments of the present disclosure may be transformed into the garnet phase through a lithiation process and the phase transition temperature is lower (e.g., 500-1000° C.), the precursor structure may be co-fired with the cathode material (e.g., lithium cobalt oxide ($LiCoO_2$)) to form a thin lamination structure. That is, through the embodiments of the present disclosure, the thickness of the solid electrolyte may be effectively reduced, thereby improving the ionic conductivity of the solid electrolyte ion battery.

BRIEF DESCRIPTION OF THE DRAWINGS

Aspects of the embodiments of the present disclosure can be understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional operations can be provided before, during, and after the method, and some of the operations described can be replaced or eliminated for other embodiments of the method.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean+/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood through one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

Different embodiments disclosed below may repeat reference numerals and/or letters in the various examples. This repetition is for the purpose of simplicity and clarity and does not in itself dictate a relationship between the various embodiments and/or configurations discussed.

In some embodiments of the present disclosure, the precursor structure includes the pyrochlore phase, and the pyrochlore phase of the precursor structure may be transformed into the garnet phase through a lithiation process. Since the phase transition temperature of the garnet phase is lower (e.g., 500-1000° C.), the precursor structure may be co-fired with the cathode material (e.g., lithium cobalt oxide ($LiCoO_2$)) to form a thin lamination structure.

Figure 1:
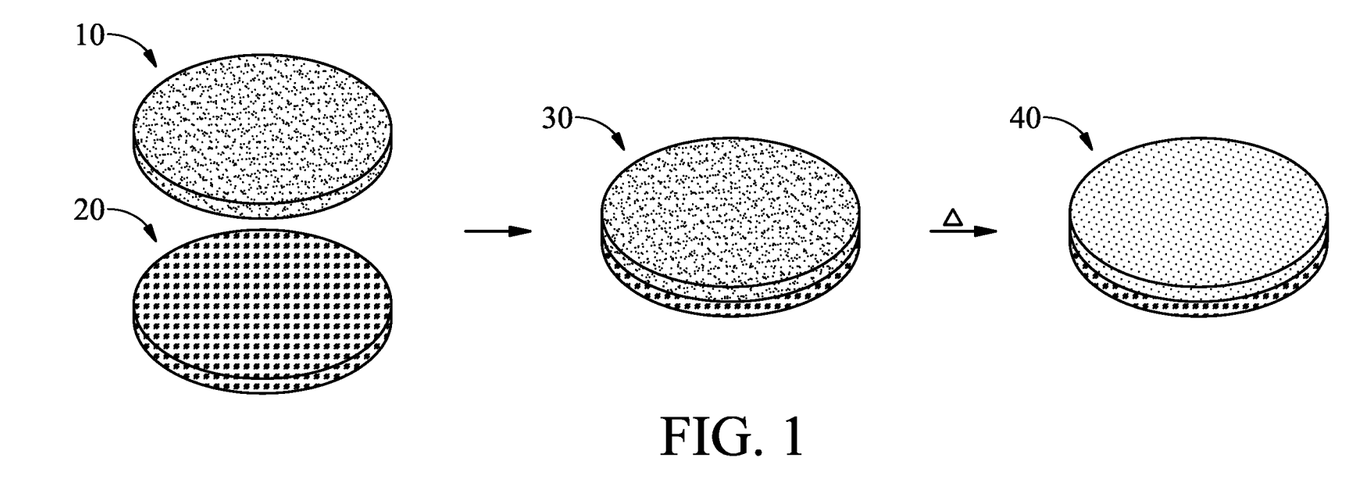
FIG. 1 illustrates a manufacturing method of an ion-conducting layer according to one embodiment of the present disclosure.

FIG. 1 illustrates a manufacturing method of an ion-conducting layer according to one embodiment of the present disclosure. It should be noted that some components or process steps may be omitted in all the figures of the present disclosure for the sake of brevity.

Referring to FIG. 1, firstly, a precursor structure 10 is provided. In the embodiment of the present disclosure, the precursor structure 10 may have the following chemical formula:

wherein M is a trivalent ion or a pentavalent ion, M' is a bivalent ion, x=0-1, y=0-1.5, and the precursor structure 10 includes a pyrochlore phase.

In some embodiments, the ratio of the pyrochlore phase to the whole precursor structure 10 may be 30-100 wt %. For example, it may be 50-90 wt % or 60-80 wt %, but the present disclosure is not limited thereto. In some embodiments, M ion of the precursor structure 10 may include tantalum (Ta), niobium (Nb), gallium (Ga), barium (Ba), rubidium (Rb), aluminum (Al), any other applicable trivalent ion or pentavalent ion, or a combination thereof, but the present disclosure is not limited thereto. In some embodiments, M' ion of the precursor structure 10 may include calcium (Ca), but the present disclosure is not limited thereto. In some embodiments, the thickness of the precursor structure 10 may be 5-30 μm, but the present disclosure is not limited thereto.

For example, lanthanum oxide ($La_2O_3$), zirconium dioxide ($ZrO_2$), tantalum pentoxide ($Ta_2O_5$), and calcium oxide (CaO) may be mixed and calcined to form pyrochlore powders. The pyrochlore powders may have the following chemical formula:

$$(La_2Zr_{1.4}Ta_{0.6}O_7) \cdot \frac{1}{2}(La_{1.5}Ca_{0.5}O_3).$$

Then, the pyrochlore powders may be mixed with an organic binder to form a pyrochlore pellet, and the pyrochlore pellet may be regarded as the precursor structure 10 shown in FIG. 1. In some embodiments, the material of the organic binder may include poly(vinyl alcohol) (PVA), poly(vinyl butyral) (PVB), polyvinyl pyrrolidone (PVP), or other adhesive organic resins, but the present disclosure is not limited thereto.

Referring to FIG. 1, an active structure 20 is provided. In some embodiments, the active structure 20 may serve as a cathode of the ion-conducting layer. For example, the material of the active structure 20 may include lithium cobalt oxide ($LiCoO_2$, LCO), lithium nickel cobalt manganese oxide (NMC), or any other applicable material, but the present disclosure is not limited thereto. Similarly, the foregoing material may be mixed with an organic binder to form an active material pellet, and the active material pellet may be regarded as the active structure 20 shown in FIG. 1.

As shown in FIG. 1, then, the precursor structure 10 and the active structure 20 may be laminated (pressed) to form a lamination film 30.

As shown in FIG. 1, then, the lamination film 30 is heated in a lithium-containing environment, so that the precursor structure 10 with the pyrochlore phase may be transformed into a garnet phase to form a garnet/active structure lamination film 40. This step may be regarded as co-firing the precursor structure 10 and the active structure 20.

For example, the lamination film 30 may be covered with a lithium-containing diffusion sheet (not shown in FIG. 1), and then the lamination film 30 may be heated to 500-1000° C. In some embodiments, the lithium-containing diffusion sheet may include $Li_2O$, LiOH, $Li_2CO_3$, or a combination thereof, but the present disclosure is not limited thereto.

In more detail, the lamination film 30 may be first heated to about 600° C. to remove the binder in the precursor structure 10 and the active structure 20; then, the lamination film 30 is heated to about 700° C., so that lithium ions in the diffusion sheet enter the lamination film 30 (precursor structure 10), and the pyrochlore phase of the precursor structure 10 is transformed into the garnet phase. The foregoing process may be referred to as a lithiation phase transformation process.

Figure 2:
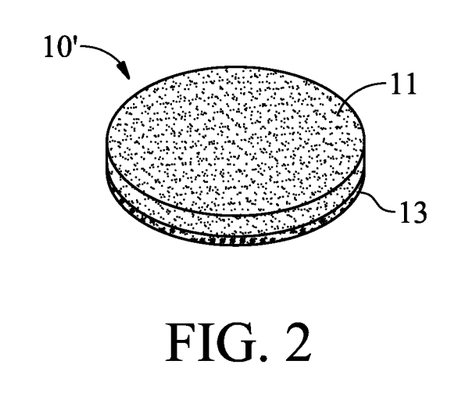
FIG. 2 illustrates a precursor structure according to another embodiment of the present disclosure.

Although the precursor structure 10 is a single-layer structure in the foregoing embodiment, the embodiments of the present disclosure are not limited thereto. FIG. 2 illustrates a precursor structure 10' according to another embodiment of the present disclosure.

Referring to FIG. 2, in some embodiments, the precursor structure 10' includes garnet phase 11. Moreover, the precursor structure 10' further includes an active material 13, and the active material 13 may also be disposed on one side of the garnet phase 11. In some embodiments, the active material 13 may further improve the binding force between the precursor structure 10' and the active structure 20. That is, the active material 13 may include the material of the garnet phase 11 and the material of the active structure 20.

For example, the active material 13 may include the material having the formula $$(La_2Zr_{2-x}M_xO_7) \cdot \frac{1}{2}(La_{2-y}M'_yO_3),$$

and include lithium cobalt oxide or lithium nickel cobalt manganese oxide dispersed in the foregoing material, but the present disclosures is not limited thereto. In some embodiments, the precursor structure 10' of FIG. 2 may be co-fired with the active structure 20, and the active structure 20 is disposed on the active material 13.

In a conventional solid electrolyte ion battery (e.g., a solid electrolyte lithium-ion battery), the formation temperature of the solid-state electrolyte layer (e.g., 1100-1200° C.) is higher than that of the positive electrode material, and it cannot be co-fired with the positive electrode material to form a higher strength structure. Therefore, it is necessary to increase the thickness of the solid electrolyte layer or the positive electrode material, so that the thickness cannot be reduced.

Compared with the conventional solid electrolyte ion battery, since the pyrochlore phase of the precursor structure according to the embodiments of the present disclosure may be transformed into the garnet phase through a lithiation process and the phase transition temperature is lower (e.g., 500-1000° C.), the precursor structure may be co-fired with the cathode material (e.g., lithium cobalt oxide ($LiCoO_2$)), so that it is not necessary to increase the thickness of the precursor structure or the positive electrode material (i.e., the active structure 20) to form a higher-strength layer (i.e., the lamination layer 30). Therefore, a thin lamination structure may be formed. That is, through the embodiments of the present disclosure, the thickness of the solid electrolyte may be effectively reduced, thereby improving the ionic conductivity of the solid electrolyte ion battery.

The following provides some embodiments according to the present disclosure and a comparative example of the precursor structure. In addition, FIGS. 3A-5B show X-ray diffraction (XRD) diagrams of Embodiment 1 to Embodiment 3 at different stages to analyze the crystal phase of the structure at each stage.

Embodiment 1

Lanthanum oxide ($La_2O_3$), zirconium dioxide ($ZrO_2$), and tantalum pentoxide ($Ta_2O_5$) are mixed and calcined at about 1400° C. to form pyrochlore powders. The structure of the pyrochlore powders is $$(La_2Zr_{1.4}Ta_{0.6}O_7) \cdot \frac{1}{2}(La_2O_3).$$

Figure 3A:
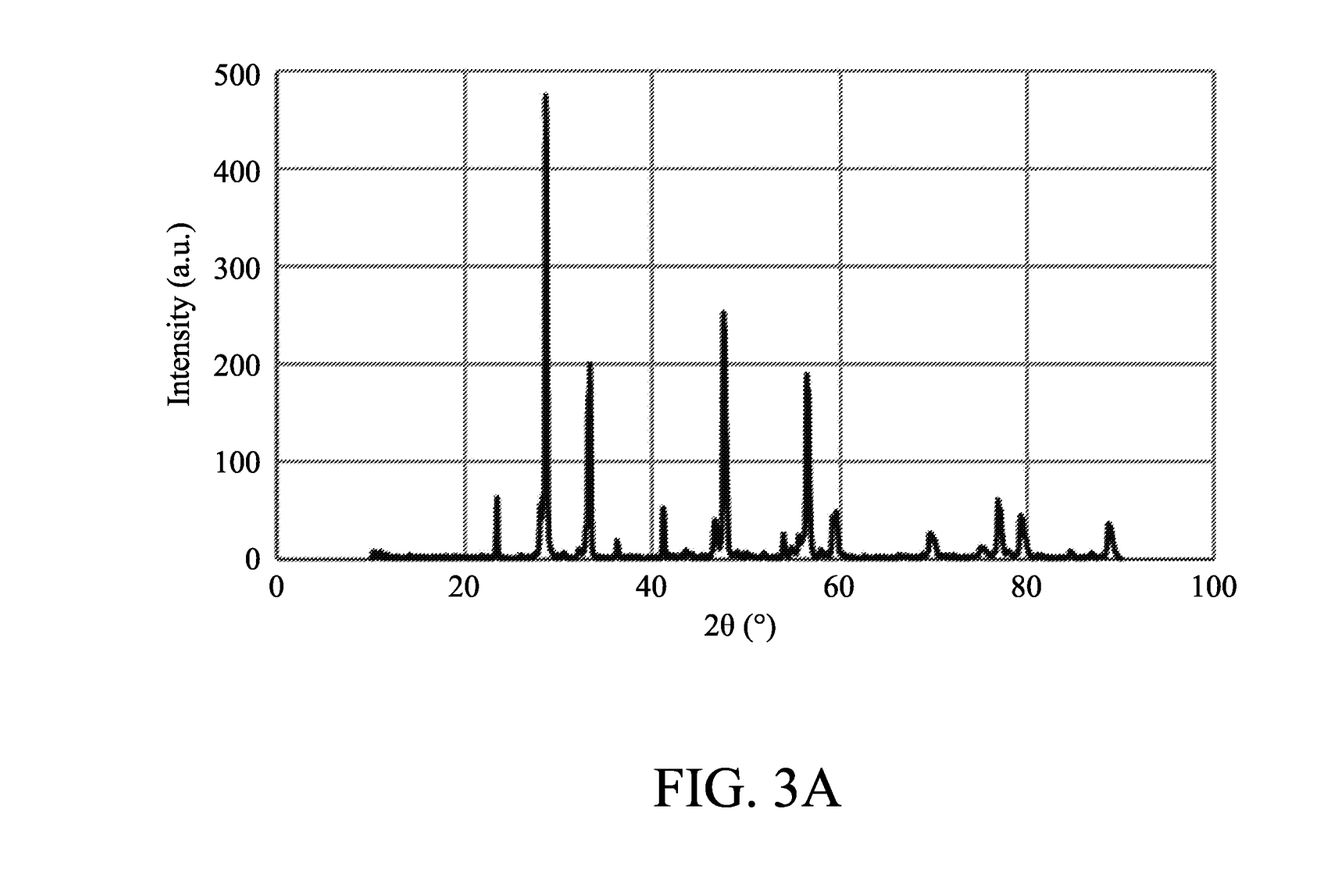
FIG. 3A shows an X-ray diffraction diagram of Embodiment 1 at one stage.
Figure 3B:
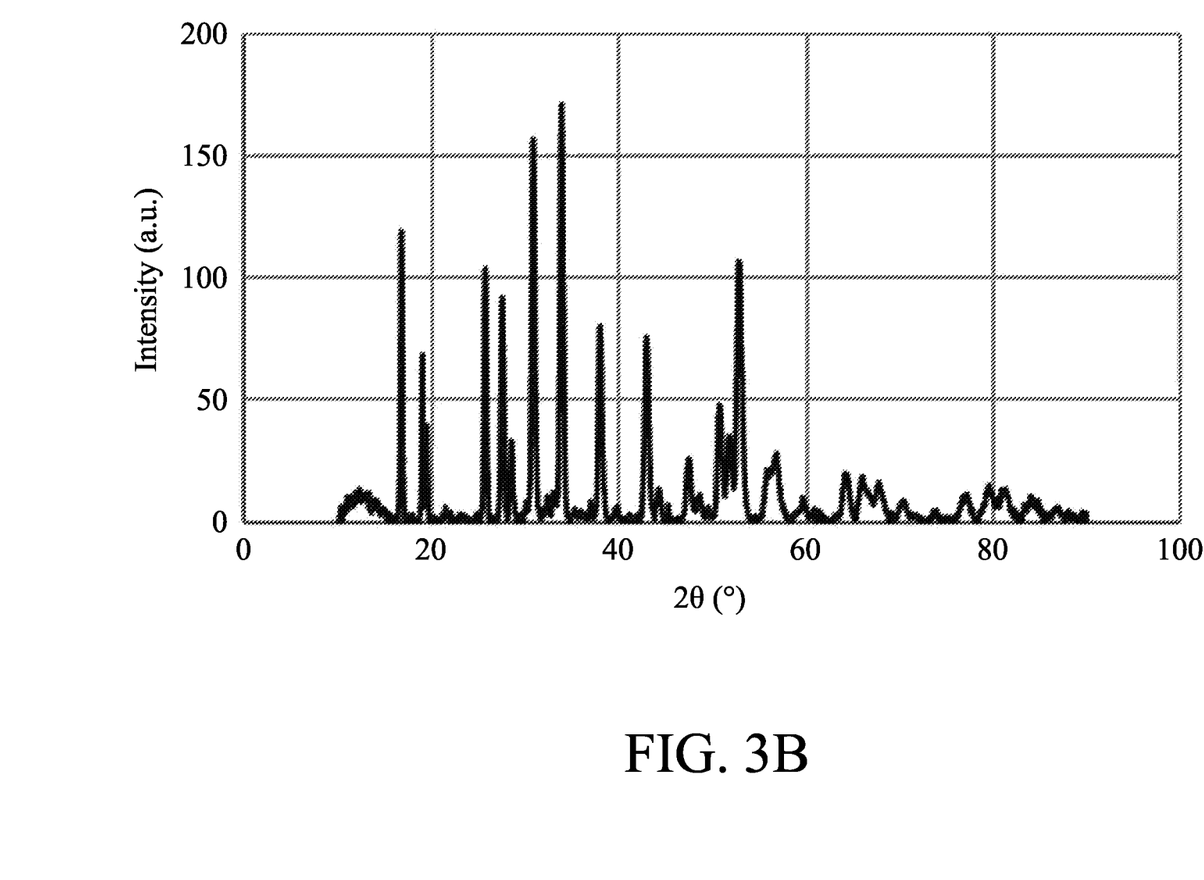
FIG. 3B shows an X-ray diffraction diagram of Embodiment 1 at another stage.

As shown in FIG. 3A, the ratio of pyrochlore phase is about 90% (calculated by the ratio of the peak areas at 28.6 degrees, 33.1 degrees, 47.6 degrees, 56.5 degrees, 59.2 degrees, 76.9 degrees, 88.8 degrees to the total peak area). Then, a lithiation process is performed at about 700° C., so that the pyrochlore phase of the foregoing structure may be transformed into a garnet phase. As shown in FIG. 3B, the ratio of garnet phase is greater than 90% (calculated by the ratio of the peak areas at 16.7 degrees, 19.3 degrees, 25.7 degrees, 27.5 degrees, 30.8 degrees, 33.8 degrees, 37.9 degrees, 42.9 degrees, 50.7 degrees, 51.8 degrees, 52.7 degrees to the total peak area).

Embodiment 2

Figure 4A:
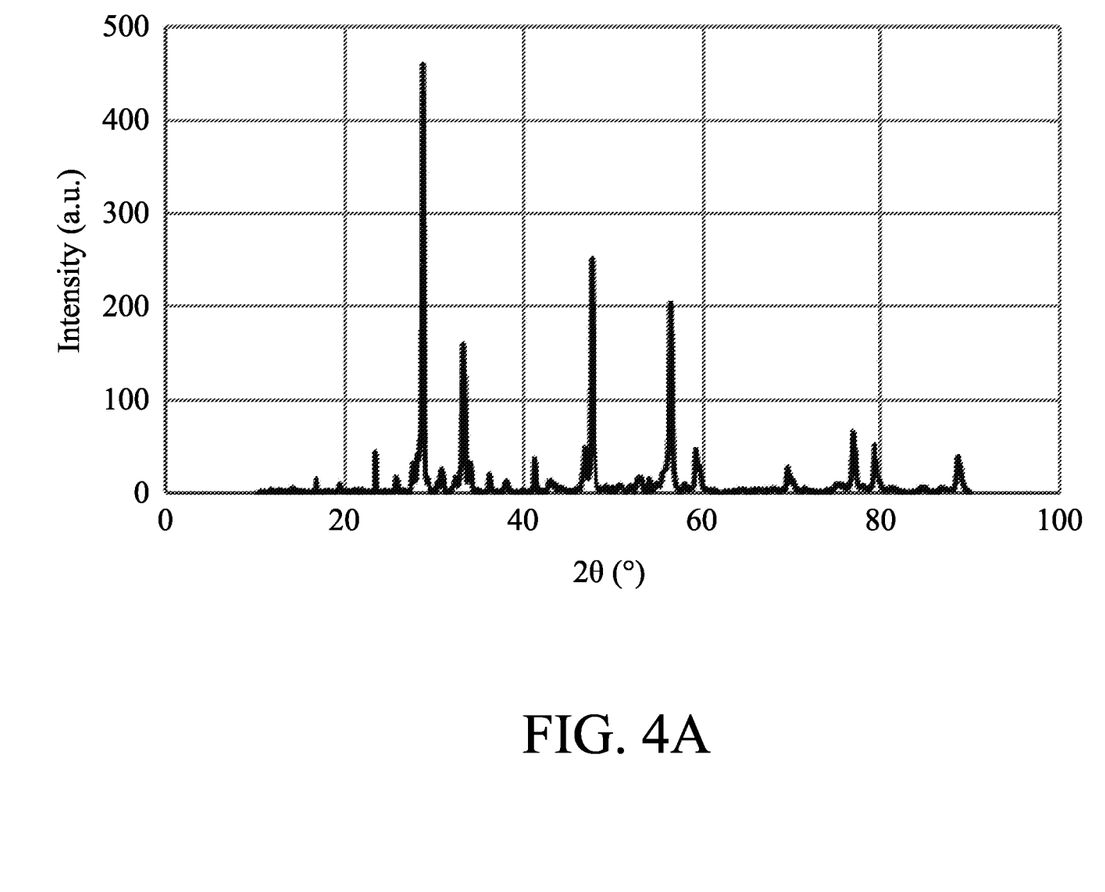
FIG. 4A shows an X-ray diffraction diagram of Embodiment 2 at one stage.
Figure 4B:
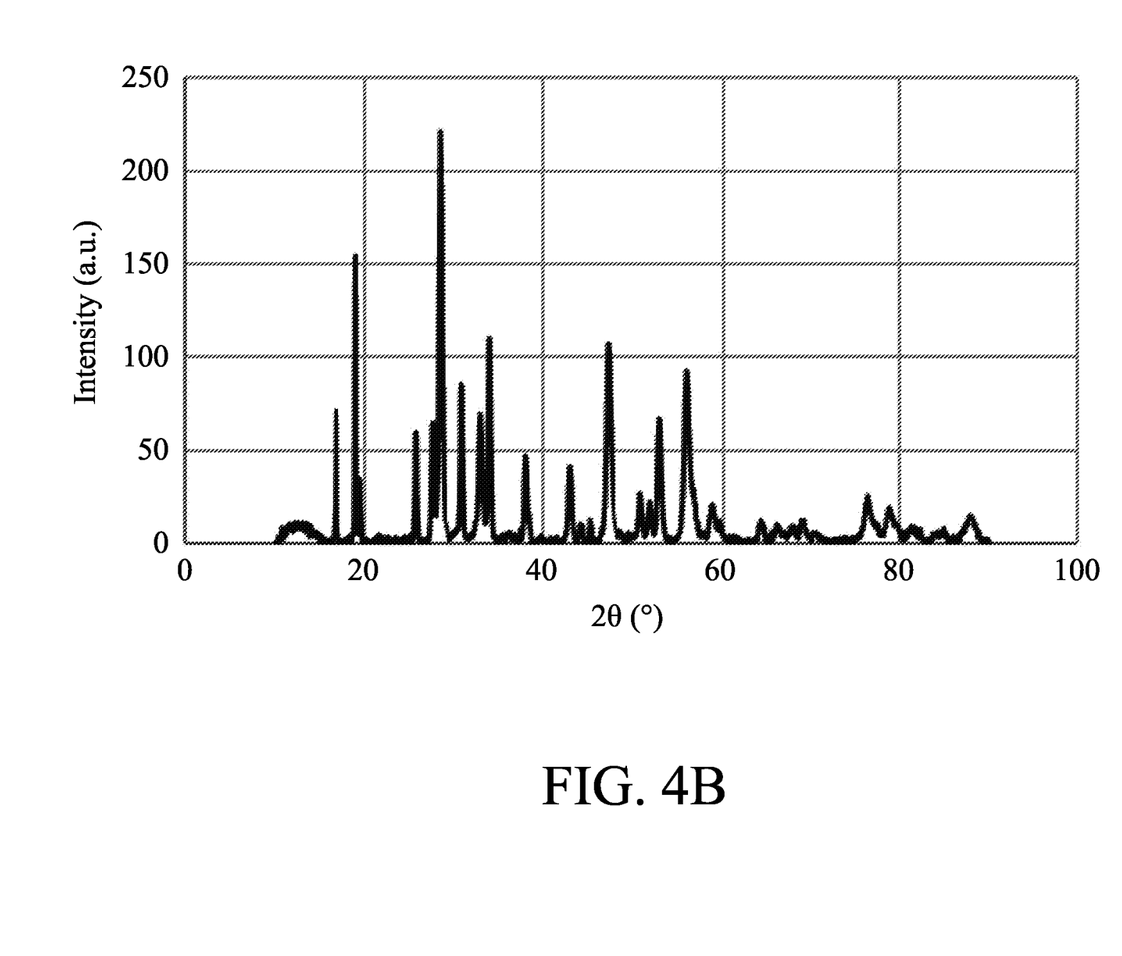
FIG. 4B shows an X-ray diffraction diagram of Embodiment 2 at another stage.

Lanthanum oxide ($La_2O_3$), zirconium dioxide ($ZrO_2$), and calcium oxide (CaO) are mixed and calcined at about 1400° C. to form pyrochlore powders. The structure of the pyrochlore powders is As shown in FIG. 4A, the ratio of pyrochlore phase is about 75% (the calculation method is the same as in Embodiment 1). Then, a lithiation process is performed at about 700° C., so that the pyrochlore phase of the foregoing structure may be transformed into a garnet phase. As shown in FIG. 4B, the ratio of garnet phase is greater than 90% (the calculation method is the same as in Embodiment 1).

Embodiment 3

Figure 5A:
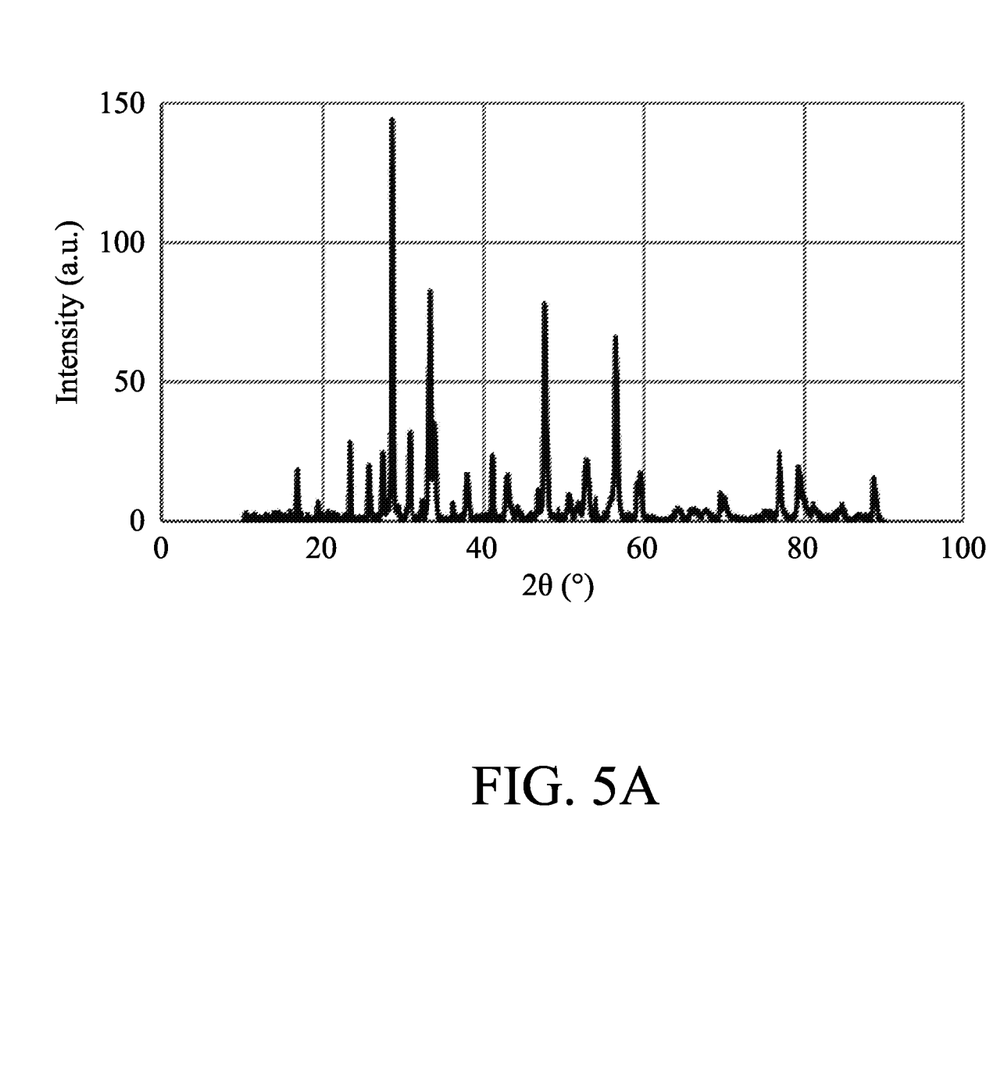
FIG. 5A shows an X-ray diffraction diagram of Embodiment 3 at one stage.
Figure 5B:
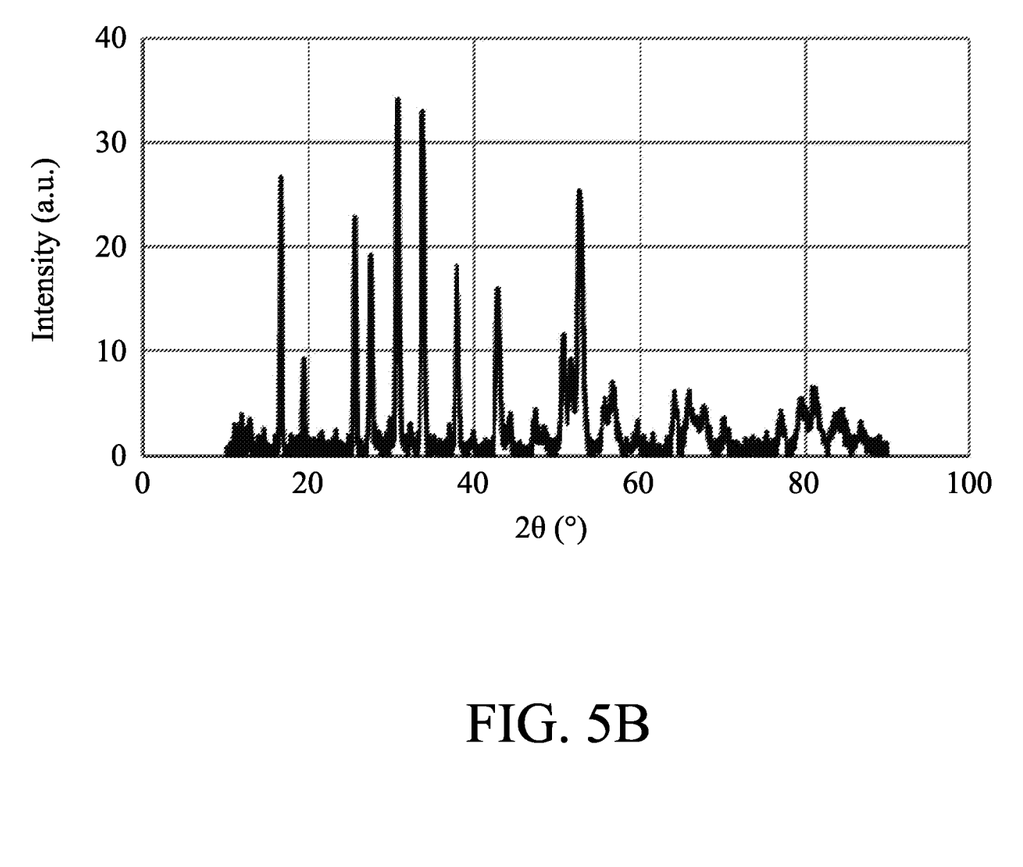
FIG. 5B shows an X-ray diffraction diagram of Embodiment 3 at another stage.

Lanthanum oxide ($La_2O_3$), zirconium dioxide ($ZrO_2$), and rubidium carbonate ($Rb_2CO_3$) are mixed and calcined at about 1400° C. to form pyrochlore powders. The structure of the pyrochlore powders is As shown in FIG. 5A, the ratio of pyrochlore phase is about 65% (the calculation method is the same as in Embodiment 1). Then, a lithiation process is performed at about 700° C., so that the pyrochlore phase of the foregoing structure may be transformed into a garnet phase. As shown in FIG. 5B, the ratio of garnet phase is greater than 90% (the calculation method is the same as in Embodiment 1).

Comparative Example

Lanthanum oxide ($La_2O_3$) and zirconium dioxide ($ZrO_2$) are mixed and calcined at about 1400° C. to form pyrochlore powders. The structure of the pyrochlore powders is $La_2Zr_2O_7$. The ratio of pyrochlore phase is about 90%. Then, a lithiation process is performed at about 700° C., so that the pyrochlore phase of the foregoing structure may be transformed into a garnet phase. The ratio of garnet phase is less than 50%.

The results of the foregoing Embodiments 1-3 and Comparative Example are recorded in Table 1 below:

TABLE 1

| | structure of the pyrochlore powders | ratio of pyrochlore phase | ratio of garnet phase | whether it can be used as an ion conductive layer |
|---|---|---|---|---|
| Embodiment 1 | $(La_2Zr_{1.4}Ta_{0.6}O_7) \cdot \frac{1}{2}(La_2O_3)$ | 90% | >90% | yes |
| Embodiment 2 | $(La_2Zr_2O_7) \cdot \frac{1}{2}(La_{1.5}Ca_{0.5}O_3)$ | 75% | >90% | yes |
| Embodiment 3 | $(La_2Zr_{1.6}Rb_{0.4}O_7) \cdot \frac{1}{2}(La_2O_3)$ | 65% | >90% | yes |
| Comparative Example | $La_2Zr_2O_7$ | 90% | <50% | no |

Here, whether it can be used as the ion-conducting layer is determined based on the ratio of the garnet phase. When the ratio of the garnet phase is greater than or equal to 50%, it can be used as an ion conductive layer; on the other hand, when the ratio of garnet phase is less than 50%, it cannot be used as an ion conductive layer. Referring to the results in Table 1, when the components of the formed precursor structure and the ratios of the components accord with the present disclosure (i.e., Embodiments 1-3), the precursors can be used as an ion conductive layer after the lithiation process. In contrast, when the components of the formed precursor structure and the ratios of the components do not accord with the present disclosure (i.e., Comparative Example), the precursors cannot be used as the ion conductive layer after the lithiation process.

FIGS. 6-10 illustrate schematic diagrams of forming a solid-state ion battery series connection structure 100 at various stages according to some embodiments of the present disclosure.

Figure 6:
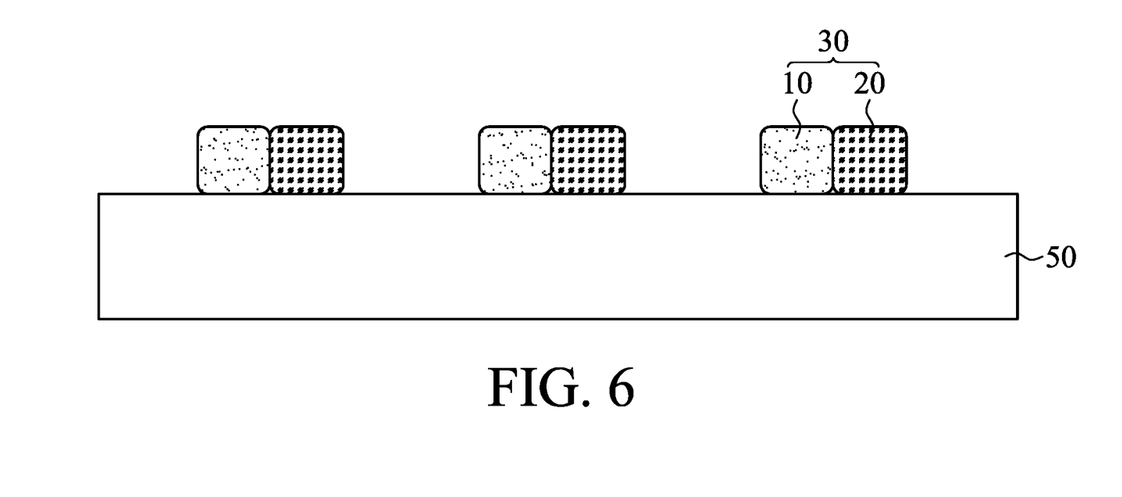
FIG. 6 illustrates a schematic diagram of forming a solid-state ion battery series connection structure at one stage according to some embodiments of the present disclosure.

Referring to FIG. 6, a substrate 50 is provided. In some embodiments, the substrate 50 may be, for example, a ceramic substrate, but the present disclosure is not limited thereto. Then, as shown in FIG. 6, a plurality of lamination films 30 that are formed of precursor structures 10 and active structures 20 are formed on the substrate 50.

The materials of the precursor structure 10 and the active structure 20 and the method of forming the lamination film 30 are as described above, and are not described in detail here. In addition, in some embodiments, the precursor structure 10' shown in FIG. 2 may be used instead of the precursor structure 10 to be laminated with the active structure 20 to form the lamination film 30.

Figure 7:
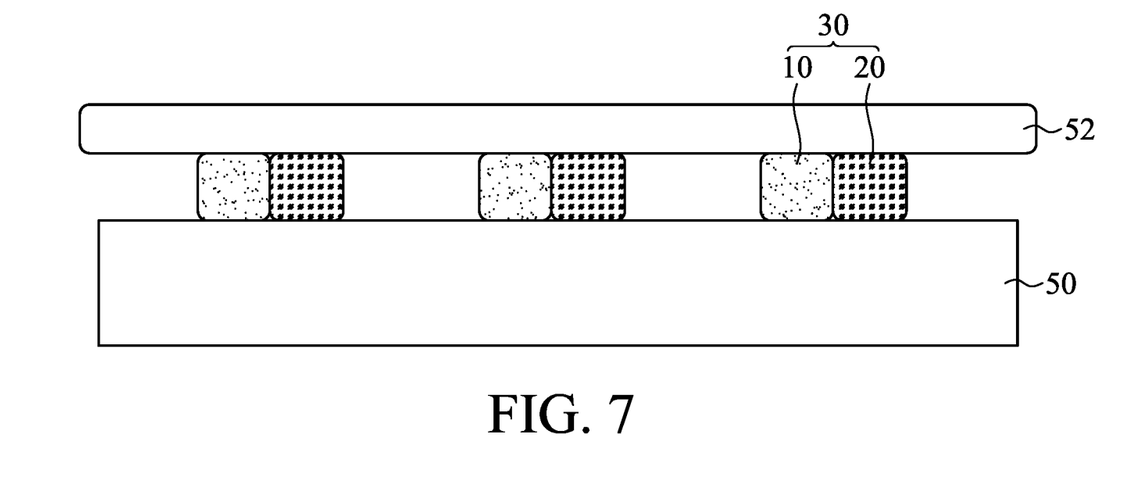
FIG. 7 illustrates a schematic diagram of forming a solid-state ion battery series connection structure at one stage according to some embodiments of the present disclosure.

Referring to FIG. 7, the lamination films 30 are covered with a lithium-containing diffusion sheet 52.

Figure 8:
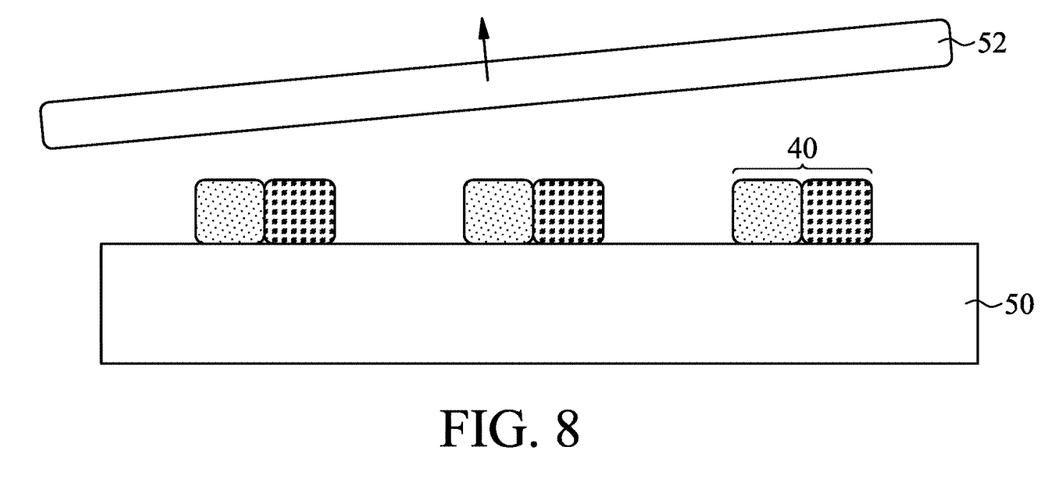
FIG. 8 illustrates a schematic diagram of forming a solid-state ion battery series connection structure at one stage according to some embodiments of the present disclosure.

Referring to FIG. 8, a heating process is performed to transform the pyrochlore phases of the precursor structures 10 (or the precursor structures 10') into garnet phases to form a plurality of garnet/active structure lamination films 40. Then, the (lithium-containing) diffusion sheet 52 is removed.

Figure 9:
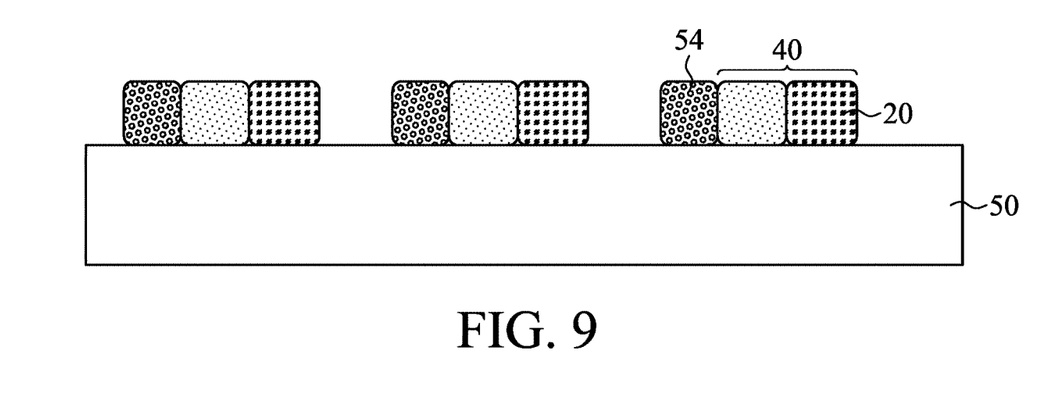
FIG. 9 illustrates a schematic diagram of forming a solid-state ion battery series connection structure at one stage according to some embodiments of the present disclosure.

Referring to FIG. 9, a plurality of first metal layers 54 (e.g., lithium) is formed on the substrate 50. In particular, each of the first metal layers 54 is adjacent to each of the garnet/active structure lamination films 40 and disposed on one side opposite to each of the active structures 20.

Figure 10:
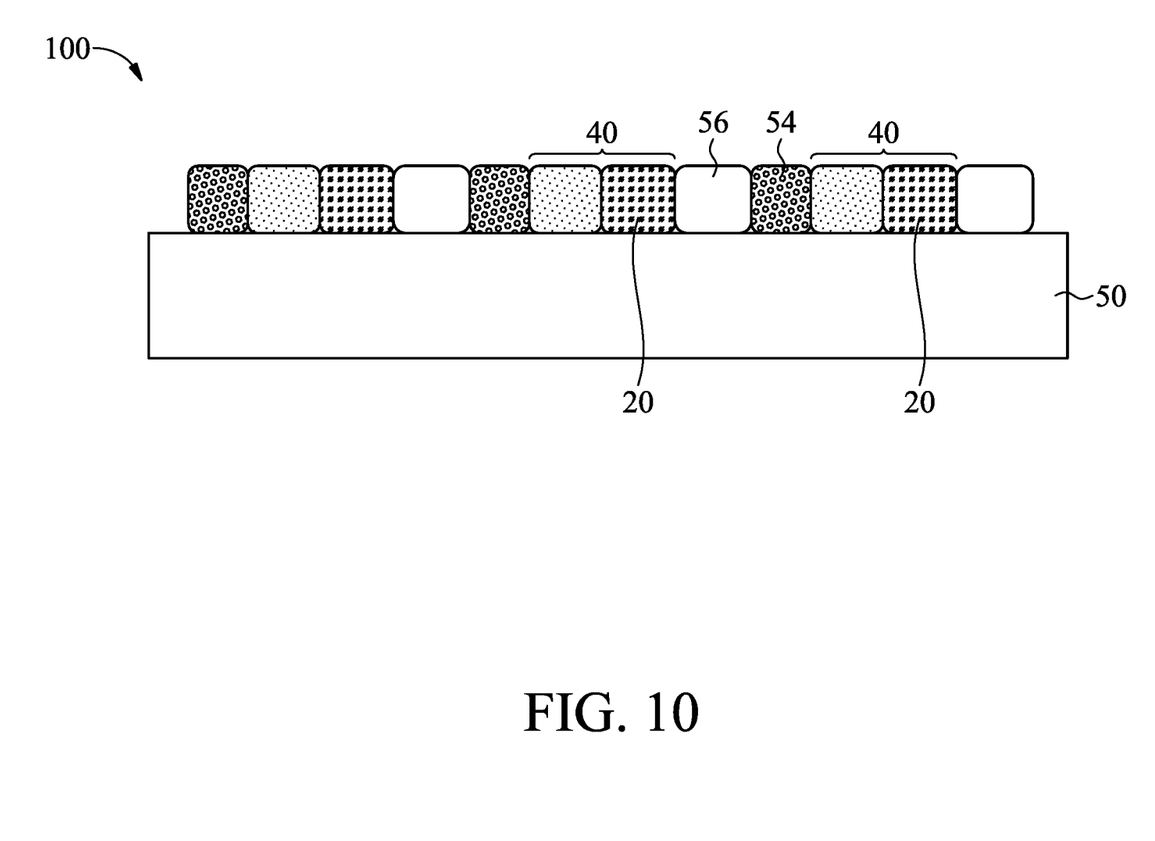
FIG. 10 illustrates a schematic diagram of forming a solid-state ion battery series connection structure at one stage according to some embodiments of the present disclosure.

Referring to FIG. 10, a plurality of second metal layers 56 (e.g., copper) is formed on the substrate 50. In particular, the second metal layers 56 may fill the remaining spaces on the substrate 50. That is, two sides of each second metal layer 56 are respectively adjacent to the first metal layer 54 and the active structure 20 to form the solid-state ion battery series connection structure 100, but the present disclosure is not limited thereto.

In summary, the precursor structure according to the embodiments of the present disclosure may be co-fired with the cathode material, and the pyrochlore phase of the precursor structure may be transformed into the garnet phases through a lithiation process. Therefore, a thin lamination structure may be formed. Through the precursor structure including a pyrochlore phase, the lamination film of the same, and a manufacturing method of the ion-conducting layer using the same provided in the embodiments of the present disclosure, the thickness of the solid electrolyte may be effectively reduced, thereby improving the ionic conductivity of the solid electrolyte ion battery.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. A precursor structure having the following chemical formula:

$$(La_2Zr_{2-x}M_xO_7) \cdot \frac{1}{2}(La_{2-y}M'_yO_3),$$

wherein M is a trivalent ion or a pentavalent ion, M' is a bivalent ion, x=0-1, y=0-1.5, and the precursor structure comprises a pyrochlore phase.

2. The precursor structure as claimed in claim 1, wherein a ratio of the pyrochlore phase to the precursor structure is 30-100 wt %.

3. The precursor structure as claimed in claim 1, wherein M comprises tantalum, niobium, gallium, barium, rubidium, aluminum, or a combination thereof.

4. The precursor structure as claimed in claim 1, wherein M' comprises calcium.

5. The precursor structure as claimed in claim 1, wherein a thickness of the precursor structure is 5-30 μm.

6. The precursor structure as claimed in claim 1, wherein the pyrochlore phase is transformed into a garnet phase in a lithium-containing environment.

7. The precursor structure as claimed in claim 6, wherein the pyrochlore phase is transformed into the garnet phase at 500-1000° C.

8. A lamination film, comprising:
a precursor structure having the following chemical formula:

$$(La_2Zr_{2-x}M_xO_7) \cdot \frac{1}{2}(La_{2-y}M'_yO_3),$$

wherein M is a trivalent ion or a pentavalent ion, M' is a bivalent ion, x=0-1, y=0-1.5, and the precursor structure comprises a pyrochlore phase; and
an active structure disposed on one side of the precursor structure.

9. The lamination film as claimed in claim 8, wherein a material of the active structure comprises lithium cobalt oxide or lithium nickel cobalt manganese oxide.

10. The lamination film according to claim 8, wherein the precursor structure further comprises an active material disposed on one side of the pyrochlore phase.

11. The lamination film according to claim 10, wherein the active structure is disposed on the active material.

12. The lamination film according to claim 11, wherein the active material comprises lithium cobalt oxide or lithium nickel cobalt manganese oxide.

13. A manufacturing method of an ion-conducting layer, comprising:
laminating a precursor structure and an active structure to form a lamination film, wherein the precursor structure has the following chemical formula:

$$(La_2Zr_{2-x}M_xO_7) \cdot \frac{1}{2}(La_{2-y}M'_yO_3),$$

where M is a trivalent ion or a pentavalent ion, M' is a bivalent ion, x=0-1, y=0-1.5, and the precursor structure comprises a pyrochlore phase; and
heating the lamination film in a lithium-containing environment, so that the pyrochlore phase is transformed into a garnet phase.

14. The manufacturing method of the ion-conducting layer as claimed in claim 13, wherein a material of the active structure comprises lithium cobalt oxide or lithium nickel cobalt manganese oxide.

15. The manufacturing method of the ion-conducting layer as claimed in claim 13, wherein the step of heating the lamination film in the lithium-containing environment comprises:
covering the lamination film with a lithium-containing diffusion sheet; and
heating the lamination film to 500-1000° C.

16. The manufacturing method of the ion-conducting layer as claimed in claim 15, wherein the lithium-containing diffusion sheet comprises $Li_2O$, $LiOH$, $Li_2CO_3$, or a combination thereof.

17. A forming method of a solid-state ion battery series connection structure, comprising:
providing a substrate;
forming a plurality of lamination films on the substrate, wherein the lamination films are formed of a plurality of precursor structures and a plurality of active structures, wherein each of the precursor structures has the following chemical formula:

$$(La_2Zr_{2-x}M_xO_7) \cdot \frac{1}{2}(La_{2-y}M'_yO_3),$$

M is a trivalent ion or a pentavalent ion, M' is a bivalent ion, x=0-1, y=0-1.5, and the precursor structures comprise pyrochlore phases;

covering the lamination films with a lithium-containing diffusion sheet;

heating the lamination films to transform the pyrochlore phases of the precursor structures into garnet phases to form a plurality of active structure lamination films;

removing the lithium-containing diffusion sheet;

forming a plurality of first metal layers on the substrate, wherein each of the first metal layers is adjacent to each of the active structure lamination films and disposed on one side opposite to each of the active structures; and forming a plurality of second metal layers on the substrate, wherein the second metal layers fill remaining spaces on the substrate.

* * * * *